(12) United States Patent  (10) Patent No.: US 6,283,781 B1
Mori  (45) Date of Patent: Sep. 4, 2001

(54) ELECTRICITY-SUPPLYING CONNECTOR (75) Inventor: Shigeo Mori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/707,973

(22) Filed: Nov. 8, 2000

(30) Foreign Application Priority Data

Nov. 8, 1999 (JP) .................................................. 11-316663

(51) Int. Cl.[7] .................................................. H01R 13/62
(52) U.S. Cl. .................................................. 439/310
(58) Field of Search .................................. 439/157, 310, 439/372

(56) References Cited

U.S. PATENT DOCUMENTS

| 4,721,477 | 1/1988 | Lotter | 439/264 |
|---|---|---|---|
| 5,131,851 | * 7/1992 | Billger et al. | 439/34 |
| 5,545,049 | * 8/1996 | Hasegawa et al. | 9/310 |
| 5,575,675 | 11/1996 | Endo et al. | 439/310 |
| 5,637,977 | * 6/1997 | Saito et al. | 320/2 |
| 5,664,960 | * 9/1997 | Fukushima | 439/310 |
| 5,674,086 | * 10/1997 | Hashizawa et al. | 439/310 |
| 5,676,560 | * 10/1997 | Endo et al. | 439/310 |
| 5,777,480 | * 7/1998 | Hatagishi et al. | 324/538 |
| 5,829,997 | * 11/1998 | Okano et al. | 439/310 |

FOREIGN PATENT DOCUMENTS

| 62-195869 | 8/1987 | (JP) . |
|---|---|---|
| 7-282902 | 10/1995 | (JP) . |
| 8-78095 | 3/1996 | (JP) . |

OTHER PUBLICATIONS

Patent Abstract of Japan 07282902 Oct. 27, 1995.
Patent Abstract of Japan 08078095 Mar. 22, 1996.

* cited by examiner

Primary Examiner—Brian Sircus
Assistant Examiner—Tam Le
(74) Attorney, Agent, or Firm—Sughrue, Mion, Zinn, Macpeak & Seas, PLLC (57) ABSTRACT

An electricity-supplying connector includes an electricity-feeding connector (2), provided at an electricity-supplying device, and an electricity-receiving connector (3) provided at an electricity-receiving device. The electricity-feeding connector includes a connector body (11) having a plurality of terminals received and retained therein, a handle (14) which holds the connector body so as to move together with the connector body in accordance with the forward and backward movement of the connector body, a casing (10) in which the connector body and the handle are received so as to move forward and backward, a lever (12) pivotally mounted on an upper portion of the casing, and a toggle link mechanism (13). Wires, extending from the connector body, pass through the handle. A spring member (40) is mounted on the lever to urge the same in a direction, opposite to the rotating direction, so as to prevent the shaking of the lever when the electricity-feeding connector and the electricity-receiving connector are not fitted together.

4 Claims, 9 Drawing Sheets

ELECTRICITY-SUPPLYING CONNECTOR

BACKGROUND OF THE INVENTION

1. Field of the Invention

The present invention relates to an electricity-supplying connector used for charging an electric vehicle with electricity.

The present application is based on Japanese Patent Application No. Hei. 11-316663, which is incorporated herein by reference.

2. Description of the Related Art

An electricity-receiving device is mounted in an electric vehicle, and this electricity-receiving device is provided with an electricity-receiving connector. On the other hand, an electricity-supplying device is installed at a home, a supplying station and others. The electricity-supplying device is provided with an electricity-feeding connector for electrical connection to the electricity-receiving connector in a fitted manner.

Figure 10:
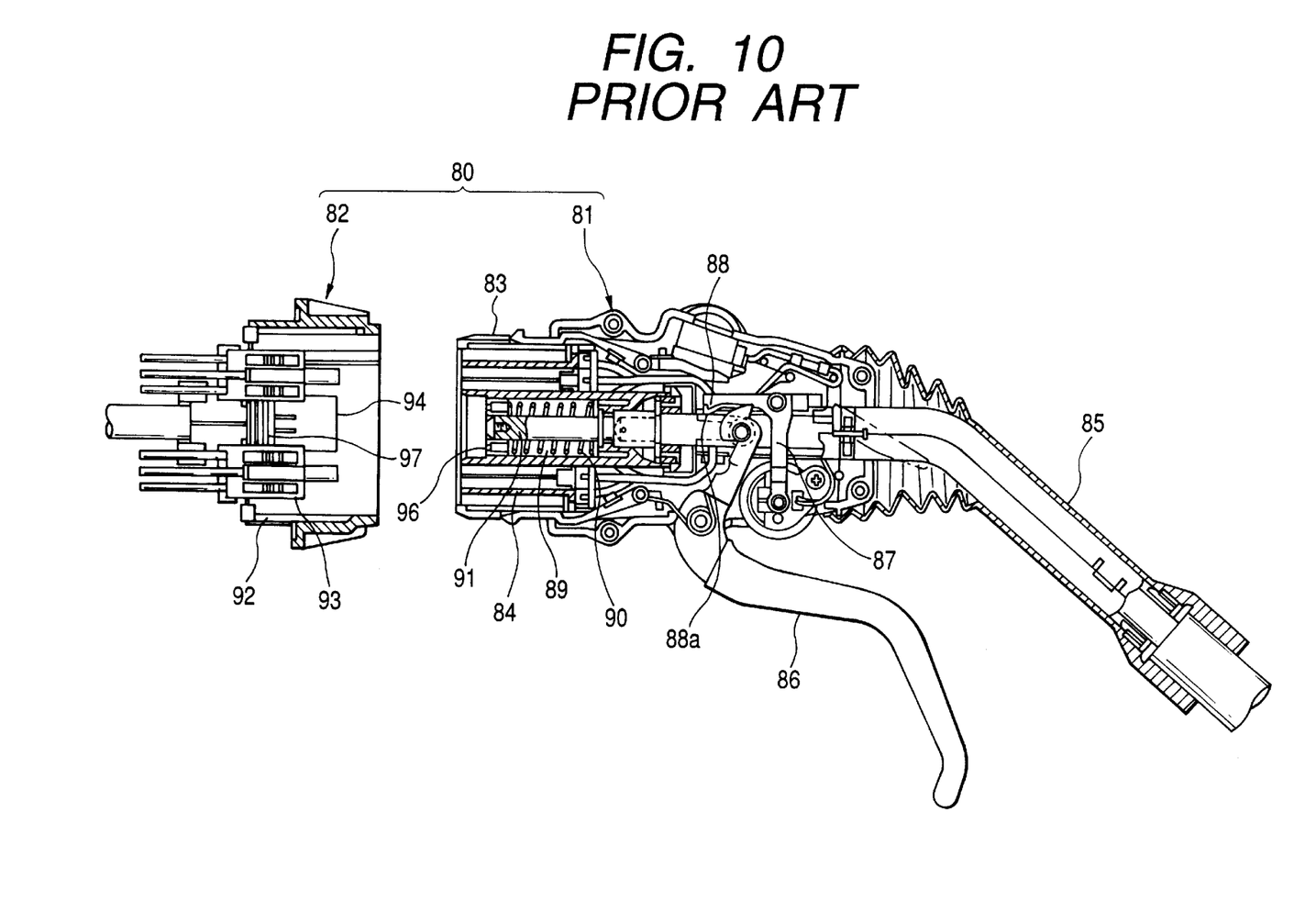
FIG. 10 is a view showing a conventional construction.

FIG. 10 shows a conventional electricity-supplying connector 80 taught by Unexamined Japanese Patent Publication No. Hei. 8-78095.

As shown in FIG. 10, this electricity-supplying connector 80 comprises an electricity-feeding connector 81, and an electricity-receiving connector 82 for electrical connection to the electricity-feeding connector 81.

The electricity-feeding connector 81 comprises a connector body 84 mounted within a front half portion of a casing 83 so as to move forward and backward, a handle 85 mounted on a rear half portion of the casing 83, and a pivotally-movable lever 86 provided below the handle 85. An L-shaped cancellation lever 87 for locking the lever 86 is provided within the casing 83, and a retaining projection 88 is formed at a distal end of the cancellation lever 87. A terminal receiving chamber 89 is formed within the connector body 84, and a male terminal 91, having a coil spring 90 wound thereon, is received and retained in the terminal receiving chamber 89.

The electricity-receiving connector 82 includes a connector body 93 provided within a shell 92, and a female terminal 94 is received and retained in the connector body 93.

For fitting the electricity-feeding connector 81 and the electricity-receiving connector 82 together, the distal end portion of the casing 83 is provisionally retained in the shell 92, and the lever 86 is pivotally moved to advance the connector body 84, so that the connector bodies 84 and 93 are fitted together, thereby electrically connecting the male and female terminals 91 and 94 together.

Figure 11:
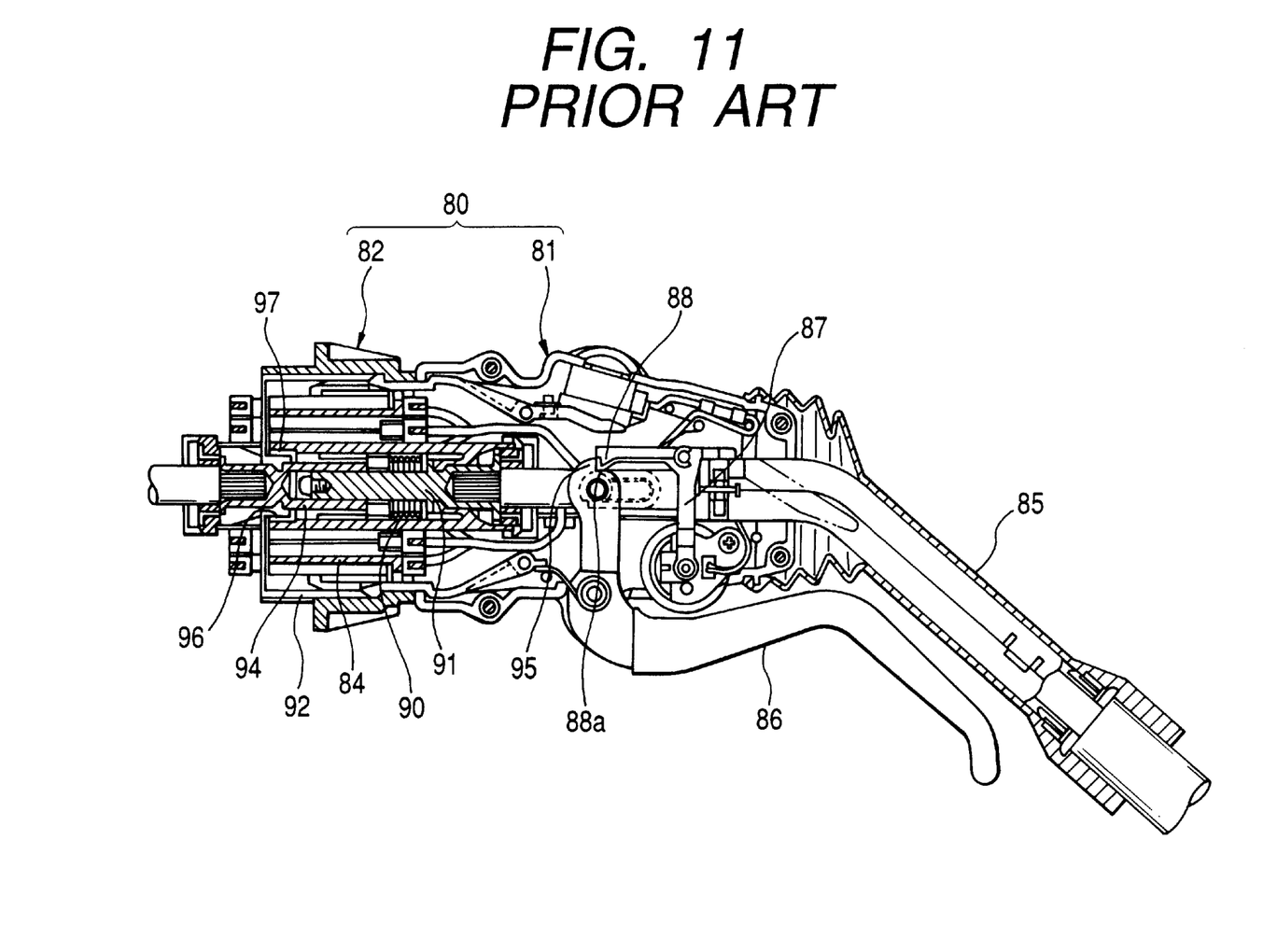
FIG. 11 is a view showing a condition in which a lever is locked after the lever is rotated to fit two connectors together.

When the two connectors 81 and 82 are thus fitted together, a retaining projection 95 on the lever 86 is engaged with the retaining projection 88 of the cancellation lever 87, thereby locking the lever 86 against pivotal movement, as shown in FIG. 11. As a result, the fitted condition is maintained.

A seal surface 96 within the casing 83 is held in contact with a packing 97, provided within the shell 92, thereby keeping the electricity-supplying connector 80 in a waterproof condition.

In the above conventional electricity-supplying connector, a large pressing force is required for fittingly connecting the electricity-feeding connector 81 to the electricity-receiving connector 82, and therefore the principle of leverage is utilized for this operation.

However, in order to obtain the larger pressing force, the electricity-supplying connector 80 itself must be formed into a larger shape. Therefore, there was encountered a disadvantage that the structure of the electricity-supplying connector 80 was complicated, so that the production cost increased.

SUMMARY OF THE INVENTION

With the above problem in view, it is an object of the present invention to provide an electricity-supplying connector in which a large pressing force can be obtained without the need for increasing the size of the connector.

To achieve the above object, according to a first aspect of the present invention, there is provided an electricity-supplying connector which includes:

an electricity-feeding connector provided on a side of an electricity-supplying device; and an electricity-receiving connector provided on a side an electricity-receiving device relative to the electricity-supplying device;

wherein the electricity-feeding connector which comprises:

a connector body having a plurality of terminals received and retained therein, a handle which holds the connector body so as to move together with the connector body in accordance with the forward and backward movement of the connector body, wires, extending from the connector body, passing through the handle, a casing in which the connector body and the handle are received so as to move forward and backward, lever pivotally mounted on an upper portion of the casing, and a toggle link mechanism comprising a drive link, pivotally supported at one end thereof so as to move in accordance with the pivotal movement of the lever, a follower link, pivotally mounted at one end thereof on an outer surface of the connector body so as to move the connector body forward and backward, and a fixing link, pivotally mounted at one end thereof on an inner surface of the casing, wherein the other ends of the fixing link, the drive link and the follower link are pivotally connected together, and wherein when a connected condition of the follower link and the fixing link is generally straight, a force of pressing of the connector body for the electricity-receiving connector is maximum.

In the first aspect of the present invention, the toggle link mechanism is provided at the electricity-feeding connector. More specifically, the toggle link mechanism comprises the drive link, pivotally connected at its one end to the lever, the follower link pivotally mounted at its one end on the outer surface of the connector body so as to move forward and backward, and the fixing link pivotally mounted at its one end on the inner surface of the casing. When the connected condition of the follower link and the fixing link is generally straight, the force of pressing of the connector body for the electricity-receiving connector is the maximum. Therefore, when this pressing force is the maximum, the fitting sides of the electricity-feeding connector and the electricity-receiving connector are closely abutted against each other.

According to a second aspect of the present invention, it is preferable that the electricity-supplying connector further includes a spring member which is mounted on the lever to urge the same in a direction, opposite to the direction of pivotal movement of the lever, so as to prevent the shaking of the lever when the electricity-feeding connector is disposed out of fitting engagement with the electricity-receiving connector.

In the second aspect of the present invention, the spring member is mounted on the lever to urge the same in the direction opposite to the direction of pivotal movement of the lever. Therefore, the lever is pivotally moved against the bias of the spring member by applying an external force to this lever. When the lever is released during the pivotal movement of this lever, the lever is automatically rotated in the opposite direction by the spring member.

According to a third aspect of the present invention, it is preferable that the electricity-supplying connector further includes:

a waterproof elastic member which is mounted on the fitting side of the connector body; and a coil spring which is contained in each of the terminals received and retained in the connector body, wherein when the lever is further pivotally moved after the connected condition of the follower link and the fixing link becomes generally straight, a resilient force, produced by the elastic member and the coil springs, and acting against the pressing force, becomes larger than the bias of the spring member.

In the third aspect of the present invention, the waterproof elastic member is mounted on the fitting side of the connector body, and the coil spring is contained in each of the terminals received and retained in the connector body. The connected condition of the follower link and the fixing link is made generally straight by pivotally moving the lever, so that the force of pressing of the electricity-feeding connector for the electricity-receiving connector becomes the largest. In this condition, when the lever is further pivotally moved, the connected condition of the follower link and the fixing link shifts from the generally-straight condition, so that the force of pressing of the electricity-feeding connector for the electricity-receiving connector becomes smaller than the maximum value. The resilient force, produced by the elastic member and the coil springs, and acting against the thus reduced pressing force, is larger than the bias of the spring member, and therefore the lever is rotated in the direction opposite to the direction in which the lever is urged. Namely, the lever is rotated in the rotating direction.

DETAILED DESCRIPTION OF THE PREFERRED EMBODIMENT

A preferred embodiment of the present invention will now be described with reference to FIGS. 1 to 9. FIGS. 1 to 9 show one preferred embodiment of an electricity-supplying connector of the present invention.

Figure 1:
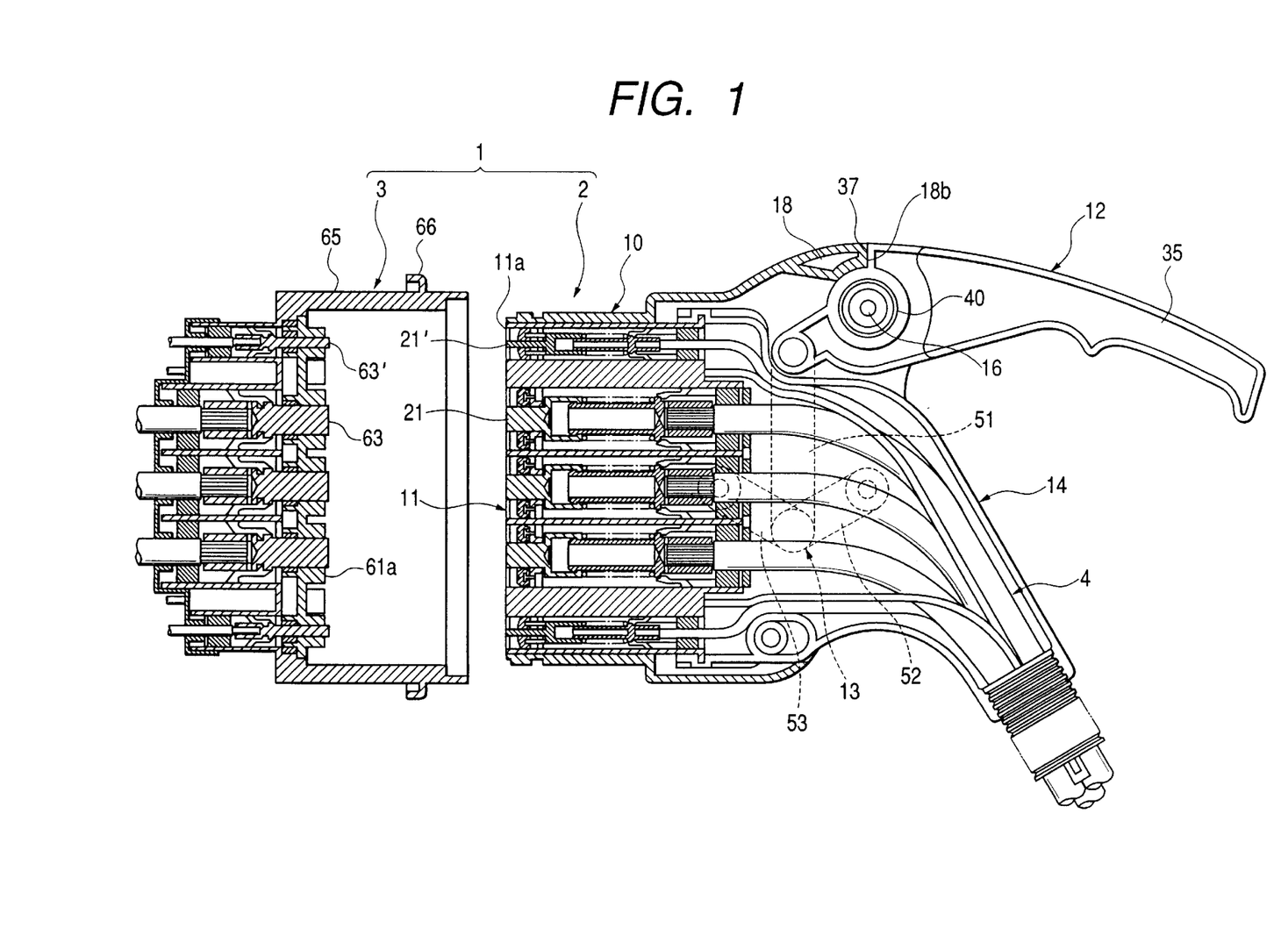
FIG. 1 is an exploded view of one preferred embodiment of an electricity-supplying connector of the present invention.

As shown in FIG. 1, this electricity-supplying connector 1 comprises an electricity-feeding connector 2, and an electricity-receiving connector 3 for fitting on the electricity-feeding connector 2.

The electricity-feeding connector 2 comprises a cylindrical tubular casing 10, a connector body 11 mounted within the casing 10 so as to move forward and backward, a lever 12 pivotally mounted on an outer surface of the casing 10, and a toggle link mechanism 13 for moving the connector body 11 forward and backward in accordance with the pivotal movement of the lever 12. The fitting side of the electricity-feeding connector 2 will hereinafter be referred to as "front end side".

Figure 2:
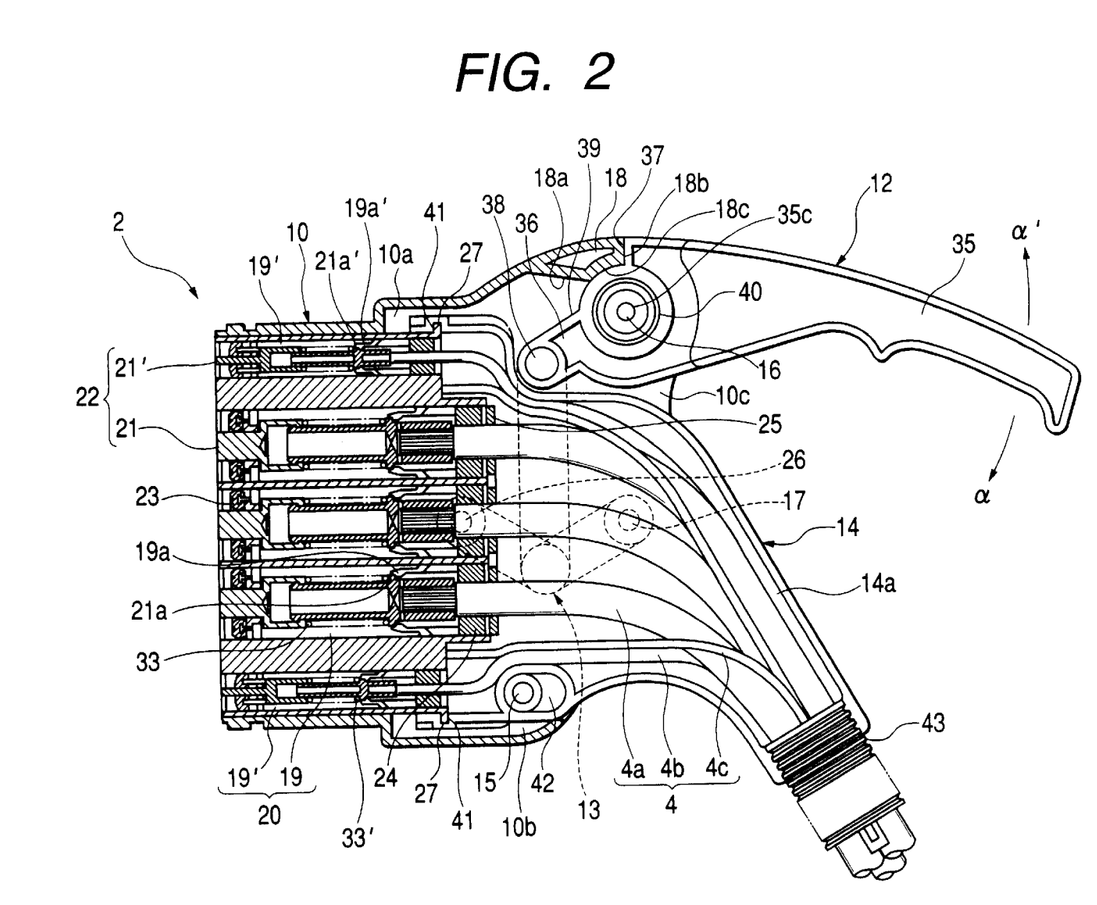
FIG. 2 is a view of an electricity-feeding connector of FIG. 1.

As shown in FIGS. 1 and 2, a connector mounting portion 10a, in which the connector body 11 is mounted, is formed at a front end portion of the casing 10, and a handle mounting portion 10b, on which a handle 14 is mounted, is formed at a rear end portion of the casing 10, and a lever mounting portion 10c is formed above the handle mounting portion 10b.

A handle support shaft 15 is formed on the handle mounting portion 10b, and a lever rotation shaft 16 is formed on the lever mounting portion 10c. A pair of opposed fixing link shafts 17 are formed on the inner surface of the handle mounting portion 10b.

A prevention wall 18 for preventing excessive displacement of the lever 12 is formed above the lever mounting portion 10c, that is, above the lever rotation shaft 16. A lever-stopping abutment surface 18a, slightly slanting relative to a horizontal plane, is formed at a front end portion of the prevention wall 18, and a lever reverse prevention abutment surface 18b, disposed vertically, is formed at a rear end of the projection wall 18, and a curved portion 18c, disposed in contiguous relation to the rotation portion of the lever 12, is formed on the prevention wall 18 intermediate the opposite ends thereof.

As shown in FIGS. 1 and 2, a plurality of terminal receiving chambers 19, 1' (hereinafter designated by reference numeral 20 when representing the terminal receiving chambers). Power terminals 21 are received and retained in the central terminal receiving chambers 19, respectively, and signal terminals 21' are received and retained in the upper and lower terminal receiving chambers 19', respectively. The power terminals 21 and the signal terminals 21' will hereinafter be referred to as "terminals 22" when representing these terminals 21 and 21'. A waterproof elastic member 23 is inserted and retained in a front end portion of the terminal receiving chamber 20, and a rear holder 25, which prevents rearward withdrawal of the terminal 22, is attached to the rear end of the terminal receiving chamber 20 through a waterproof plug 24. An elastic retaining arm 19a, 19a' for retaining engagement with a shoulder 21a, 21a' of the terminal 21, 21' is formed integrally within the terminal receiving chamber 19, 19'. A pair of follower link shafts 26 are formed on the outer surface of the connector body 11, and an engagement flange 27 is formed at the rear end of the connector body 11.

A power wire 4a is connected to each power terminal 21 by pressing (or press-fitting), and a signal wire 4b is connected to each signal terminal 21' by pressing (or press-fitting). Earth wires 4c are connected to the connector body 11. The power wires 4a, the signal wires 4b and the earth wires 4c will hereinafter be referred to as "wires 4".

Figure 3:
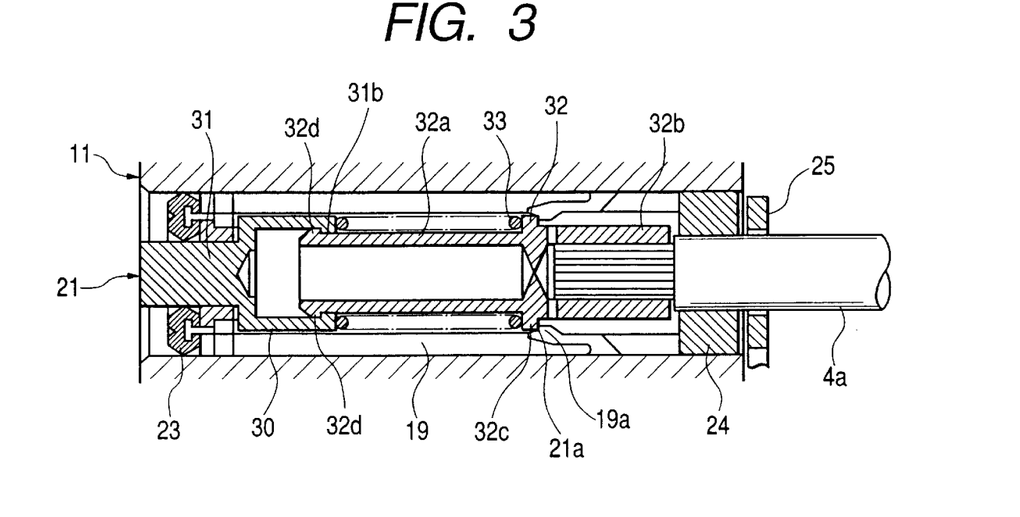
FIG. 3 is an enlarged view of a terminal in FIG. 2.

As shown in FIGS. 2 and 3, the electrically-conductive power terminal 21 includes a cylindrical terminal body 30, an electricity feeding-side contact 31 engaged in a front end portion of the terminal body 30 so as to move forward and backward, a power-side connection member 32 received and retained in a rear end portion of the terminal body 30, and a coil spring 33 provided between the electricity feeding-side contact 31 and the power-side connection member 32.

The opposite end portions of the terminal body 30 are stepped into a smaller diameter. The step portion, formed at the rear end, defines a shoulder 21a.

The electricity feeding-side contact 31 has a convex cross-section. A connection member-receiving space 31a in the form of a hole is formed in a rear end portion of the electricity feeding-side contact 31.

The power-side connection member 32 includes a tubular shell 32a at a front half portion thereof, a power wire connection hole 32b in a rear half portion thereof, and a spring engagement projection 32c formed intermediate the opposite ends thereof. The tubular shell 32a and the power wire connection hole 32b are separated from each other by a partition. A sliding projection 32d is formed on the outer surface of the tubular shell 32a at a free end thereof.

Within the terminal body 30, the coil spring 33 is provided between a rear end 31b of the electricity feeding-side contact 31 and the spring engagement projection 32c. The coil spring 33 is wound on the outer surface of the tubular shell 32a. Therefore, the electricity feeding-side contact 31 is normally urged forward.

As shown in FIGS. 1 and 2, the lever 12 includes a lever body 35 of a generally inverted V-shape, a shaft hole 35c formed in a front end of the lever body 35, an operating plate 36 extending forwardly from the front end of the lever body 35, and a lever reverse prevention surface 37 formed above the shaft hole 35c.

A spring member 40 is provided around the shaft hole 35c to urge the lever 12 in a counterclockwise direction (see a direction α'). A drive link support shaft 38 is provided at a distal end of the operating plate 36. A lever-stopping surface 39 for the lever-stopping abutment surface 18a is formed on the upper side of the operating plate 36.

A connector retaining hole 41 for the engagement flange 27 of the connector body 11 is formed in a front end portion of the handle 14. Therefore, the handle 14 moves in unison with the connector body 11 when the connector body 11 moves forward and backward. A handle-holding slot 42 for the handle support shaft 15 on the casing 10 is formed rearwardly of the connector retaining hole 41, and extends in the fitting direction. A wire passage hole 14a, through which the wires 4, extending from the connector body 11, are passed, is formed within the handle 14. A bellows-like wire cap 43 is provided at a rear end portion of the wire passage hole 14a.

Figure 4:
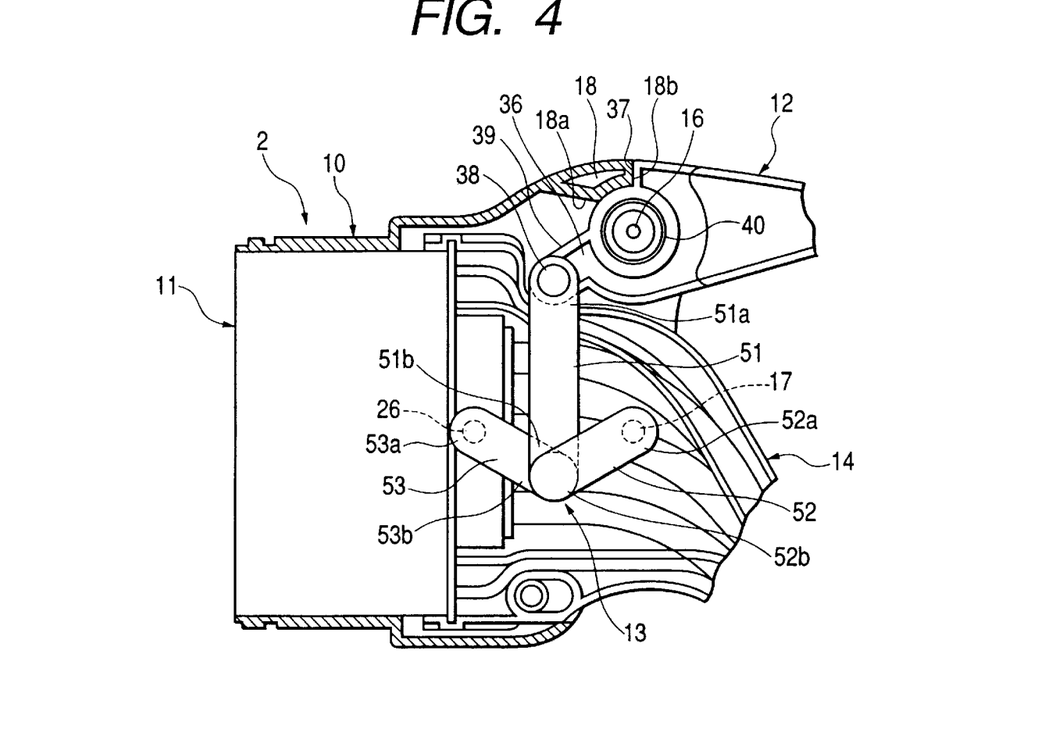
FIG. 4 is an explanatory view showing a toggle link mechanism in FIG. 2.
Figure 5:
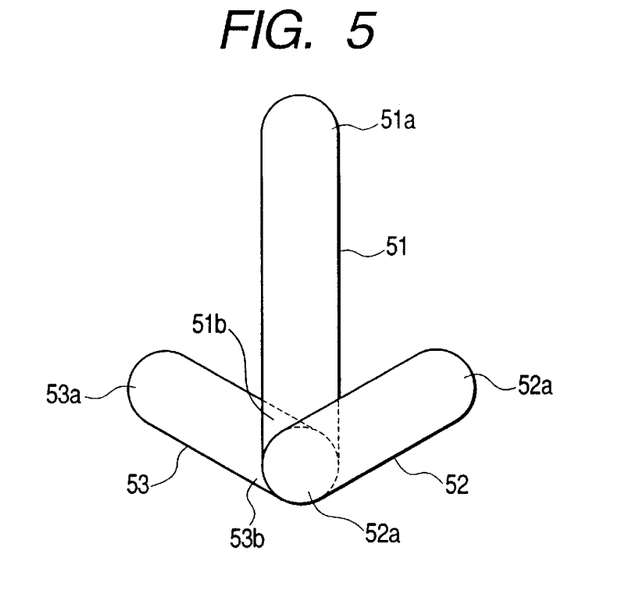
FIG. 5 is an explanatory view showing an interconnected condition of the other ends of links in FIG. 4.

As shown in FIGS. 2, 4 and 5, the toggle link mechanism 13 comprises a drive link 51, pivotally and vertically movable in accordance with the pivotal movement of the lever 12, a fixing link 52 pivotally mounted the inner surface of the casing 10, and a follower link 53 pivotally mounted on the connector body 11 so as to follow the drive link 51.

One end portion 51a of the drive link 51 is supported by the drive link support shaft 38 on the lever 12. One end portion 52a of the fixing link 52 is pivotally supported by the fixing link support shaft 17 on the casing 10. One end portion 53a of the follower link 53 is pivotally supported by the follower link support shaft 26. The other end portion 51b of the drive link 51, the other end portion 52b of the fixing link 52 and the other end portion 53b of the follower link 53 are pivotally connected together at one point. The other end portions 52b, 51b and 53b of the fixing, drive and follower links 52, 51 and 53 are arranged in this order from the outside toward the inside.

Therefore, the drive link 51 is pivotally and vertically (upward and downward) moved in accordance with the pivotal movement of the lever 12, and following the drive link 51, the fixing link 52 is pivotally moved, and also the follower link 53 is pivotally moved forward and backward. When the follower link 53 thus moves forward and backward, the connector body 11 is pushed forward toward the fitting side and is retracted.

Before the lever 12 is operated to be rotated, the lever reverse prevention surface 37 on the lever 12 is held against the lever reverse prevention abutment surface 18b of the prevention wall 18. In this condition, the drive link 51 is disposed vertically, and also the drive link 51, the fixing link 52 and the follower link 53 are arranged to assume a generally inverted convex shape.

The lever 12 is pressed down (that is, pivotally moved or rotated in a direction α) against the bias of the spring member 40, and therefore is pivotally moved in a clockwise direction. The drive link 51 is lifted by the pivotal movement of the lever 12. When the drive link 51 thus moves upward, the follower link 53 is pushed forward while pivotally moved about the one end 52a of the fixing link 52. As a result, the connector body 11 advances, and therefore the handle 14 advances, following the connector body 11.

Figure 6:
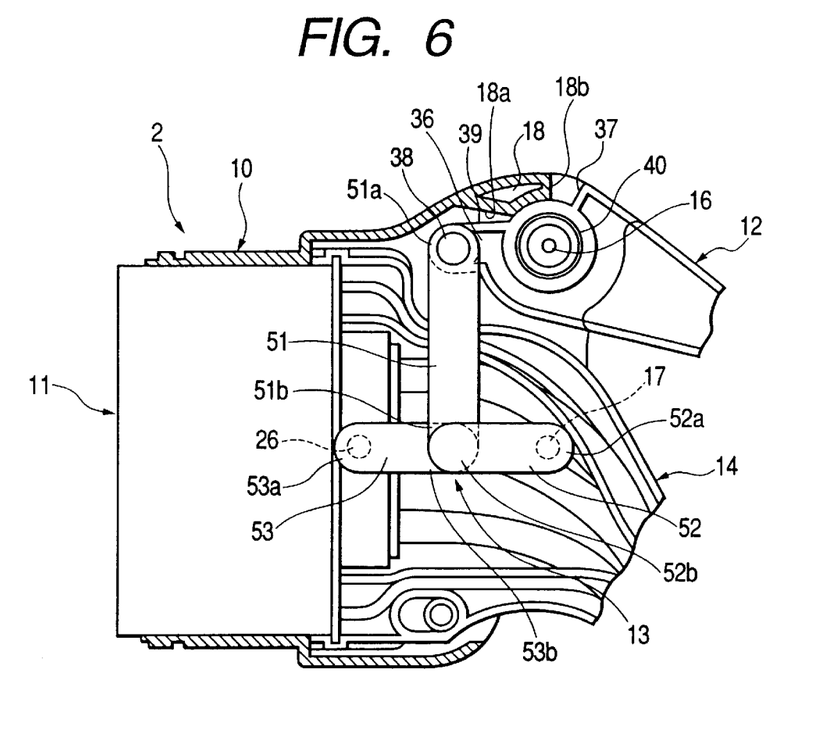
FIG. 6 is an explanatory view showing a condition in which the connected condition of the fixing link and the follower link is generally straight when the drive link is lifted.

As shown in FIGS. 2 and 6, before the pivotal movement of the lever 12 is finished, the fixing link 52 and the follower link 53 are arranged generally on a straight line. The drive link 51, the fixing link 52 and the follower link 53 are so designed that at this time, the pressing force to push the connector body 11 forward is the largest.

Figure 7:
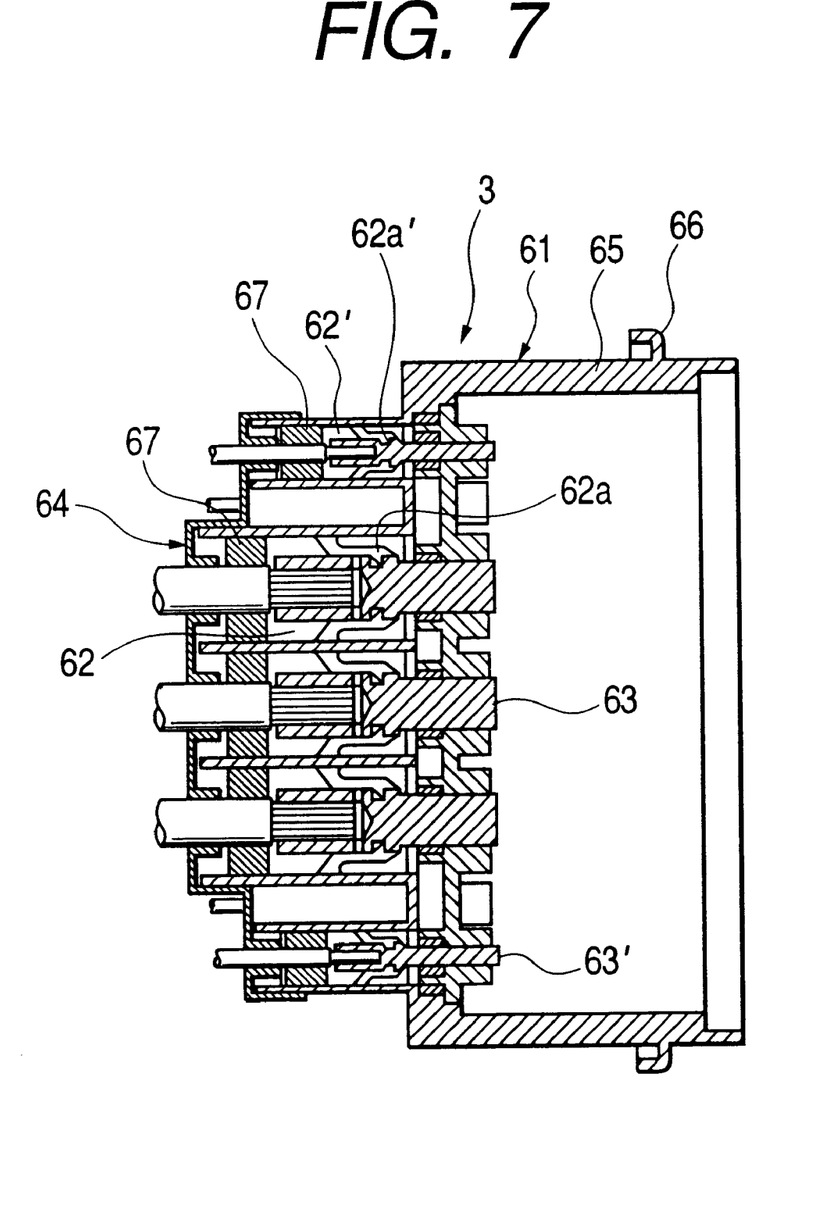
FIG. 7 is a view showing an electricity-receiving connector in FIG. 1.

As shown in FIGS. 1 and 7, the electricity-receiving connector 3 includes a housing body 61, made of an insulative resin, a plurality of terminal receiving chambers 62 and 62', formed through the housing body 61, power terminals 63, received and retained respectively in the terminal receiving chambers 62, signal terminals 63', received and retained respectively in the terminal receiving chambers 62', and a rear holder 64 attached to a rear end of the housing body 61. A hood 65 for receiving the connector body 11 of the electricity-feeding connector 2 is formed on the housing body 61 in a bulged manner. A flange 66 for mounting on a vehicle is formed on an outer surface of the hood 65. An elastic retaining arm 62a, 62a' is integrally formed within the terminal receiving chamber 62, 62'. The rear holder 64 is attached to the rear end of the housing body 61 through a waterproof plug 67.

Next, a method (process) of producing the electricity-supplying connector 1 by fitting the electricity-feeding connector 2 and the electricity-receiving connector 3 together will be described.

Figure 8:
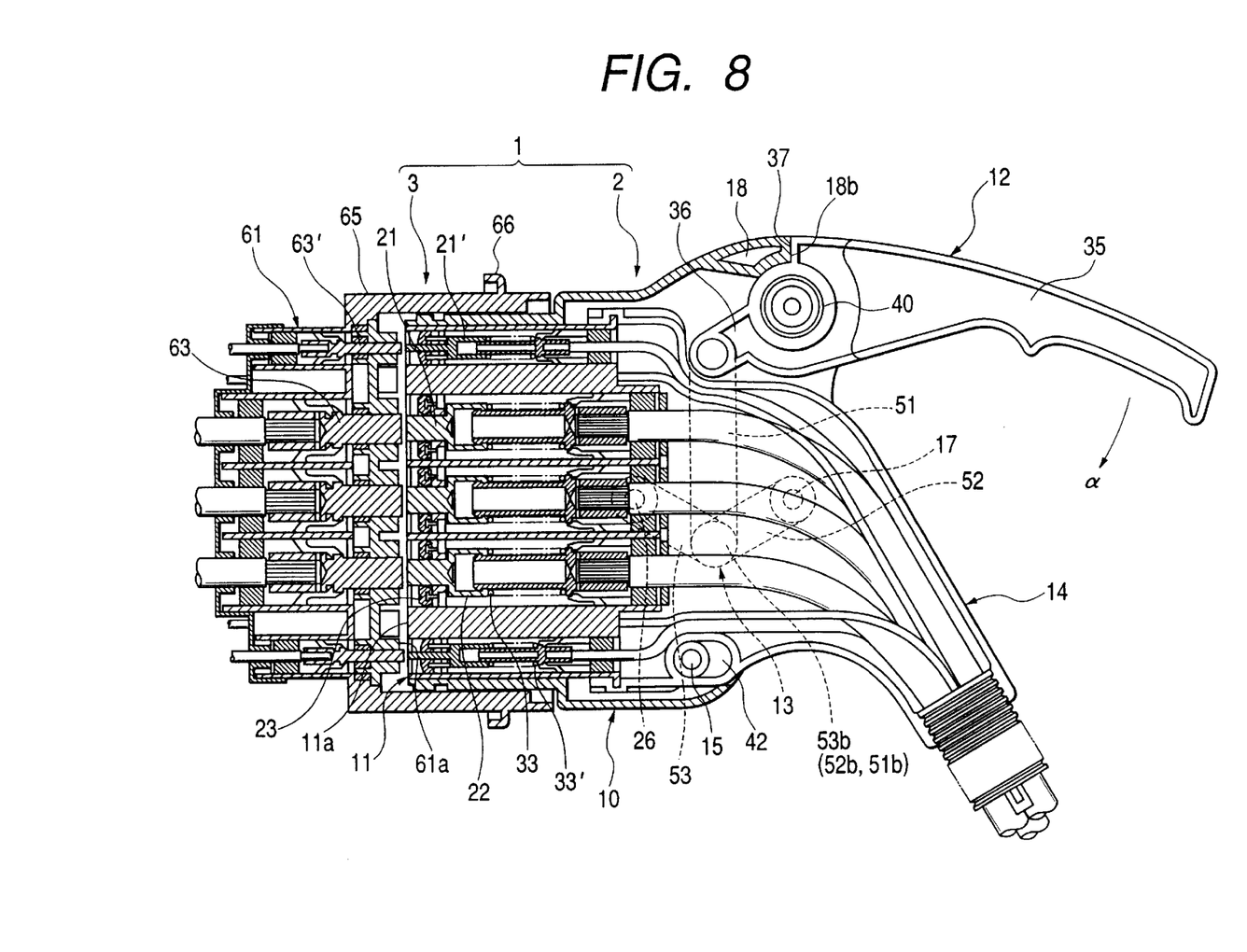
FIG. 8 is a view showing a condition in which the electricity-feeding connector and the electricity-receiving connector are provisionally retained relative to each other.

As shown in FIG. 8, the casing 10 of the electricity-feeding connector 2 is inserted into the hood 65. At this time, a fixing lock on a cap (not shown) of the electricity-receiving connector 3 is engaged in a recess (not shown) in the electricity-feeding connector 2, thereby provisionally retaining the two connectors 2 and 3 relative to each other.

In this condition, a front end surface 61a of the housing body 61 is spaced a predetermined distance from a front end surface 11a of the connector body 11, and the terminals 21 and 21' in the connector 2 are opposed respectively to the terminals 63 and 63' in the connector 3. Since the lever 12 is not yet pivotally moved, the lever reverse prevention surface 37 on the lever 12 is held against the lever reverse prevention abutment surface 18b of the prevention wall 18. The drive link 51 is disposed vertically, and the fixing link 52 is slanting upwardly in a right-hand direction, and the follower link 53 is slanting upwardly in a left-hand direction, and therefore the three links 51, 52 and 53 assume a downwardly-directed arrow-like configuration.

A grip portion 35 of the lever 12 is held with the hand, and in this condition the lever 12 is pressed down against the bias of the spring member 40. The lever 12 is pivotally moved or rotated in the clockwise direction (see the direction α). The drive link 53 is lifted in accordance with the rotation of the lever 12. In accordance with the upward movement of the drive link 51, the other ends 52b and 53b of the fixing link 52 and the follower link 53 are lifted. The fixing link 52 is pivotally moved clockwise about the fixing link support shaft 17. In accordance with the pivotal movement of the fixing link 52, the follower link 53 is pivotally moved counterclockwise about the follower link support shaft 26, and also is pushed forward. Therefore, the connector body 11 is advanced to be inserted into the hood 65 of the electricity-receiving connector 3. In accordance with the advancing movement of the connector body 11, the handle 14 is advanced. At this time, the distance of movement of the handle 14 is limited by the handle-holding slot 42.

When the lever 12 is pivotally moved in the clockwise direction (see the direction α), the drive link 51 is lifted, so that the connected condition of the fixing link 52 and the follower link 53 gradually shifts from a valley-like condition (downwardly-projecting convex condition) to a generally straight (or linear) condition (see FIG. 6).

Simultaneously when the connected condition of the fixing link 52 and the follower link 53 becomes generally straight, the front end surface 11a of the connector body 11 abuts against the front end surface 61a of the housing body 61. At this time, the force of pressing of the front end surface 11a of the connector body 11 for the front end surface 61a of the housing body 61 is the maximum. And, the pressing force, acting on the electricity-receiving connector 3 against the bias of the spring member 40, becomes equal to the resilient force produced by the elastic members 23 in the connector body 11 and the coil springs 33 and 33' mounted in the terminals 21 and 21'.

Figure 9:
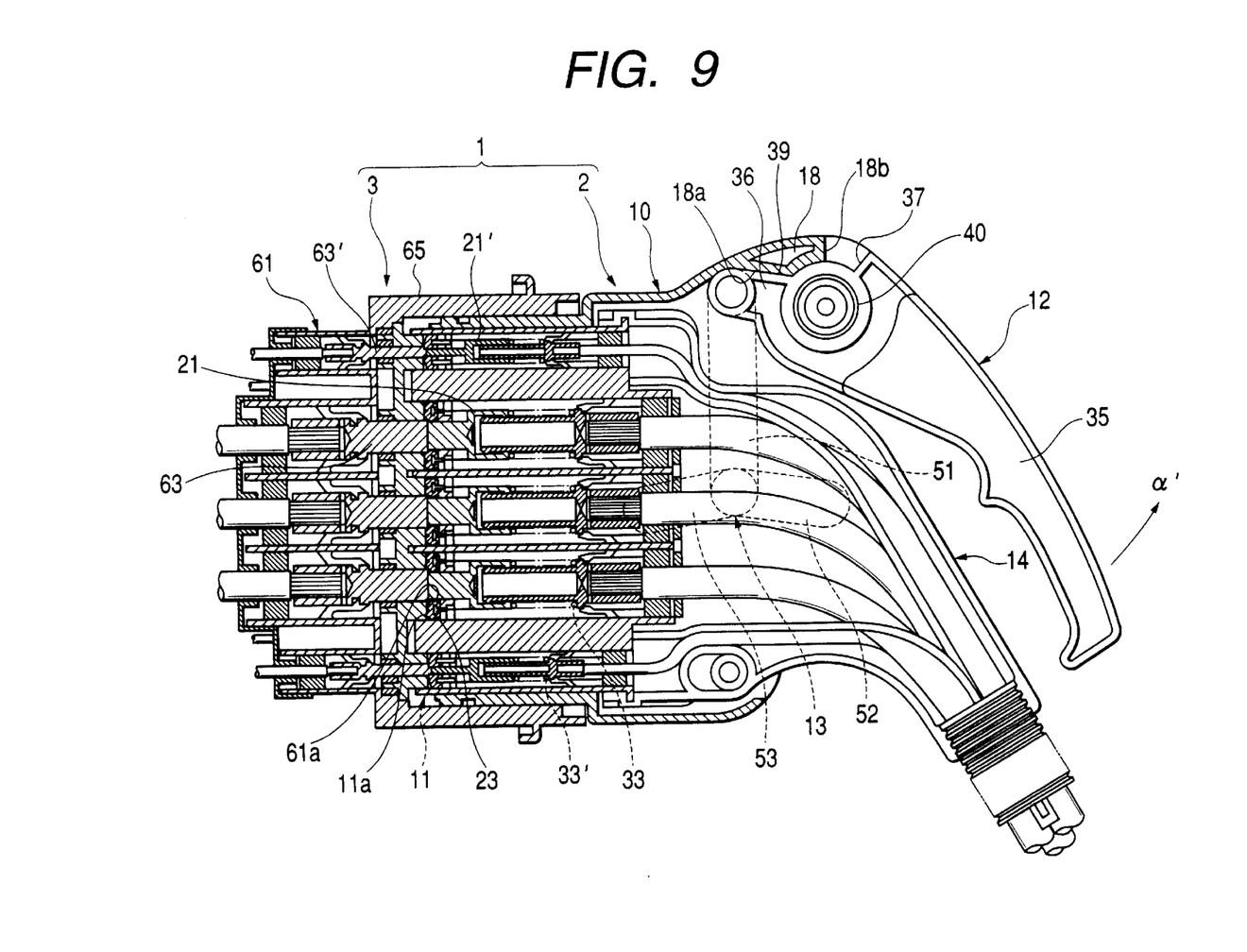
FIG. 9 is a view showing a condition in which the two connectors are fitted together by rotating a lever in FIG. 8.

When the lever 12 is slightly rotated in the direction a from the generally-linearly connected condition of the fixing link 52 and the follower link 53 as shown in FIG. 9, the force of pressing of the electricity-feeding connector 2 for the electricity-receiving connector 3 becomes smaller than the maximum value. Therefore, the resilient force, produced by the elastic members 23 and the coil springs 33 and 33' and acting against the pressing force, becomes larger than the bias of the spring member 40. As a result, the lever 12 is automatically rotated in the direction α against the bias of the spring member 40.

Namely, the connector body 11 is moved back rearward by the resilient force, and therefore the connected condition of the fixing link 52 and the follower link 53 gradually shifts from the generally straight condition to a mountain-like (convex) condition. The lever 12 is rotated in the direction α until the lever-stopping surface 39 on the lever 12 is brought into abutting engagement with the lever-stopping abutment surface 18a of the prevention wall 18.

When the rotation of the lever 12 is finished, the lever-stopping surface 39 is held against the lever-stopping abutment surface 18a by the resilient force. Therefore, the lever 12 can be locked (that is, completely retained) in the direction α without the use of any lock means as used in the conventional construction. When the lever 12 is fixed, the terminals 63 (63') in the electricity-receiving connector 3 are kept connected respectively to the terminals 21 (21') in the electricity-feeding connector 2. Thus, the electricity-feeding connector 2 and the electricity-receiving connector 3 are fitted together.

Thus, because of the provision of the link mechanism 13 as shown in FIGS. 1 to 9, the force of pressing of the electricity-feeding connector 2 for the electricity-receiving connector 3 is maintained by the resilient force which can act and react on this pressing force, and therefore any lock means, as used in the conventional construction, is not needed. Therefore, the electricity-supplying connector 1 can be more simplified in construction as compared with the conventional construction, and the small-size design of the electricity-supplying connector 1 can be achieved, and besides its production cost can be reduced.

And besides, the front end surface 61a of the electricity-receiving connector 3 can be held in intimate contact with the front end surface 11 of the electricity-feeding connector 2 by the resilient force. Therefore, a waterproof seal between the front end surface 61a of the housing body 61 and each elastic member 23 can be enhanced, and besides the electrically-connected condition of each pair of mating terminals 21 and 63 (21' and 63') in the two connectors 2 and 3 can be kept good.

As described above, in the present invention, the toggle link mechanism comprises the drive link, the follower link and the fixing link pivotally connected at their one ends to the lever, the outer surface of the connector body and the inner surface of the casing, and the other ends of these links are pivotally connected together at one point. When the connected condition of the follower link and the fixing link is generally straight, the force of pressing of the connector body for the electricity-receiving connector is the maximum. Therefore, by rotating the lever with the relatively small force, there can be positively and easily obtained the large force for pushing the connector body into the electricity-receiving connector, thus fitting the two connectors together. As a result, the waterproof packing is held in intimate contact with the two connectors, thus enhancing the waterproof effect, and besides the electrical connection between the two connectors is enhanced.

When the pressing force is the maximum, the fitting sides of the electricity-feeding connector and the electricity-receiving connector can be closely abutted against each other, and therefore as compared with the conventional construction, the sufficient pressing force can be obtained when fitting the two connectors together, and besides the reliability of the fitting connection between the two connectors can be enhanced.

In the present invention, the spring member is mounted on the lever to urge the same in the direction opposite to the direction of pivotal movement of the lever. Therefore, when the lever is released during the pivotal movement of this lever, the lever is automatically returned to its initial condition. Therefore, when the electricity-feeding connector and the electricity-receiving connection are not fitted together, the shaking of the lever can be positively prevented.

In the present invention, when the lever is slightly rotated in from the generally-linearly connected condition of the fixing link and the follower link, the pressing force becomes smaller than the maximum value. As a result, the resilient force, produced by the elastic members and the coil springs, and acting against the pressing force, becomes larger than the bias of the spring member, so that the lever is automatically rotated in the rotating direction. Therefore, as compared with the conventional construction in which the lever is locked to the casing after the rotation of the lever is finished, any lock mechanism does not need to be provided at the electricity-receiving connector and the electricity-feeding connector. Therefore, the electricity-receiving connector and the electricity-feeding connector can be simplified in construction, and the production cost of the two connectors can be reduced.

And besides, the two connectors are kept in the fitted condition by the resilient force, and therefore the connector body can be kept pressed against the electricity-receiving connector. Therefore, the waterproof seal between the two connectors fitted together, as well as the electrical connection between the two connectors, can be enhanced.

What is claimed is:

1. An electricity-supplying connector, comprising:
   an electricity-feeding connector provided on a side of an electricity-supplying device; and
   an electricity-receiving connector provided on a side an electricity-receiving device relative to the electricity-supplying device;
   wherein the electricity-feeding connector which comprises:
      a connector body having a plurality of terminals received and retained therein,
      a handle which holds the connector body so as to move together with the connector body in accordance with the forward and backward movement of the connector body, wires, extending from the connector body, passing through the handle,
      a casing in which the connector body and the handle are received so as to move forward and backward,
      a lever pivotally mounted on an upper portion of the casing, and
      a toggle link mechanism comprising:
         a drive link pivotally supported at one end thereof so as to move in accordance with the pivotal movement of the lever,
         follower link, pivotally mounted at one end thereof on an outer surface of the connector body so as to move the connector body forward and backward, and
         a fixing link, pivotally mounted at one end thereof on an inner surface of the casing,
      wherein the other ends of the fixing link, the drive link and the follower link are pivotally connected together, and
      wherein when a connected condition of the follower link and the fixing link is generally straight, a force of pressing of the connector body for the electricity-receiving connector is maximum.

2. An electricity-supplying connector according to claim 1, further comprising a spring member which is mounted on the lever to urge the same in a direction, opposite to the direction of pivotal movement of the lever, so as to prevent the shaking of the lever when the electricity-feeding connector is disposed out of fitting engagement with the electricity-receiving connector.

3. An electricity-supplying connector according to claim 2, further comprising:
   a waterproof elastic member which is mounted on the fitting side of the connector body; and
   coil spring which is contained in each of the terminals received and retained in the connector body,
   wherein when the lever is further pivotally moved after the connected condition of the follower link and the fixing link becomes generally straight, a resilient force, produced by the elastic member and the coil springs, and acting against the pressing force, becomes larger than the bias of the spring member.

4. An electricity-supplying connector according to claim 1, further comprising:
   a waterproof elastic member which is mounted on the fitting side of the connector body; and
   a coil spring which is contained in each of the terminals received and retained in the connector body,
   wherein when the lever is further pivotally moved after the connected condition of the follower link and the fixing link becomes generally straight, a resilient force, produced by the elastic member and the coil springs, and acting against the pressing force, becomes larger than the bias of the spring member.

* * * * *